G. EASTMAN.
PLATE OR FILM FOR COLOR PHOTOGRAPHY.
APPLICATION FILED MAY 31, 1910.
1,028,337.
Patented June 4, 1912.
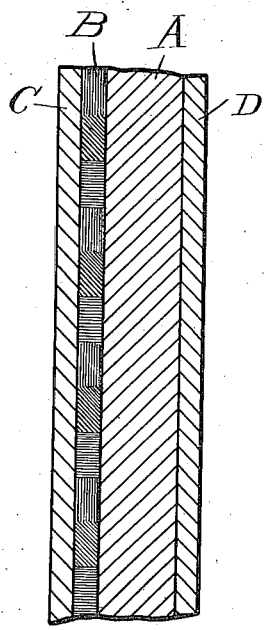
Witnesses
Nelson Copp.
Russell B. Griffith
Inventor
George Eastman
By Church & Rich
his Attorneys

UNITED STATES PATENT OFFICE.

GEORGE EASTMAN, OF ROCHESTER, NEW YORK, ASSIGNOR TO EASTMAN KODAK COMPANY, OF ROCHESTER, NEW YORK, A CORPORATION OF NEW YORK.

PLATE OR FILM FOR COLOR PHOTOGRAPHY.

1,028,337.

Specification of Letters Patent. Patented June 4, 1912.

Application filed May 31, 1910. Serial No. 564,072.

*To all whom it may concern:*

Be it known that I, GEORGE EASTMAN, of Rochester, in the county of Monroe and State of New York, have invented certain new and useful Improvements in Plates or Films for Color Photography; and I do hereby declare the following to be a full, clear, and exact description of the same.

My present invention relates to color photography and particularly to means for better carrying out the process involving the use of a plate, film or support carrying the transparent colored dots or lines through which the exposure is made, and if desired viewed, and it has for its objects to provide a film support or plate which is complete in itself and may be used in an ordinary camera without the use of a separate ray filter.

To this end the invention consists of a suitable transparent support, preferably of flexible transparent material, such as cellulose, either nitrocellulose or acetyl cellulose or even gelatin, having thereon or therein transparent or translucent dots or lines in the colors usually employed in color photography as red, green and blue, and over this a sensitized photographic emulsion preferably of gelatin, said support having on the face or side which, when the exposure is made, is next to the lens of the camera, a coating or thin film of gelatin or other suitable material containing coloring matter suitable to act as a correcting filter.

The plates or films to which this filter screen is applied and which are provided with a sensitized emulsion may be made in any suitable manner, either by having the lines or dots printed or stained in or on the cellulose support as in English Patent No. 21,840 of 1908, or in or on gelatin or by means of colored starch granules, as in the well known Lumiere plates and the filter screen is preferably formed by applying to the side opposite the sensitized emulsion a coating of gelatin dyed or stained with a suitable water soluble dye of a tint and quality capable of acting as a ray filter, and which are well known to those skilled in the art.

The dyed gelatin coating applied to a cellulose plate or film on the side opposite the emulsion serves to prevent the film from cockling or warping and insures its lying flat. In cases where the image is to be reversed so as to produce a positive, the dye employed might with advantage be of such nature that it would be discharged by the liquids used in developing and washing or otherwise, or the whole coating might be soluble and removed during the treatment of the plate or otherwise.

Films for color photography prepared in this manner are advantageous in that more nearly uniform results can be obtained and the manufacturer is assured that they will be exposed or used with a ray filter or screen prepared by himself and especially adapted to the emulsion and other special features of his product.

While other material might be used to carry the dye or stain employed as a filter screen, I prefer to employ gelatin because being of the same nature as the emulsion, it will tend to keep the film flat and true and remove any tendency to cockle, buckle or assume different shapes by reason of the hygroscopic qualities of the gelatin emulsion.

The manner of using the films prepared according to my invention is not different from that well known to those skilled in the art, the only requisite being that the side containing the filter screen is placed next the lens so that all the rays pass through it and through the colored lines or dots before reaching the emulsion.

In the drawing, which is a greatly enlarged sectional view of the film, A indicates the flexible support, B the transparent or translucent colored dots or lines, C the sensitized emulsion and D the filter screen.

I claim as my invention:

1. A polychromic plate for use in color photography embodying a support having minute differently colored transparent areas, a sensitized emulsion on one side thereof and a ray filter screen embodying removable coloring matter formed on the opposite side.

2. A polychromic plate for use in color photography embodying a support having minute differently colored transparent areas thereon, a sensitized photographic emulsion on one side thereof and a stained or dyed coating of soluble gelatin on the opposite side forming a ray filter.

3. As an article of manufacture, a polychromic film for color photography embodying a flexible support having minute differently colored transparent areas, a sensitized gelatin emulsion applied to one side thereof and a uniformly dyed or stained film of gelatin applied to the side of the support opposite the emulsion and serving as a ray filter.

4. As an article of manufacture, a polychromic plate for use in color photography embodying in a single structure a transparent support having minute differently colored transparent areas, a sensitized emulsion and a uniformly stained transparent coating upon and forming a part of said plate and constituting a ray filter which is located in front of the colored areas during exposure in a camera.

GEORGE EASTMAN.

Witnesses:
RUSSELL B. GRIFFITH,
LUCY A. VAN COURT.